Oct. 13, 1959   D. E. SMITH ET AL   2,908,818
ANALYZER AND CONTROL METHOD
Filed March 24, 1955   2 Sheets-Sheet 1
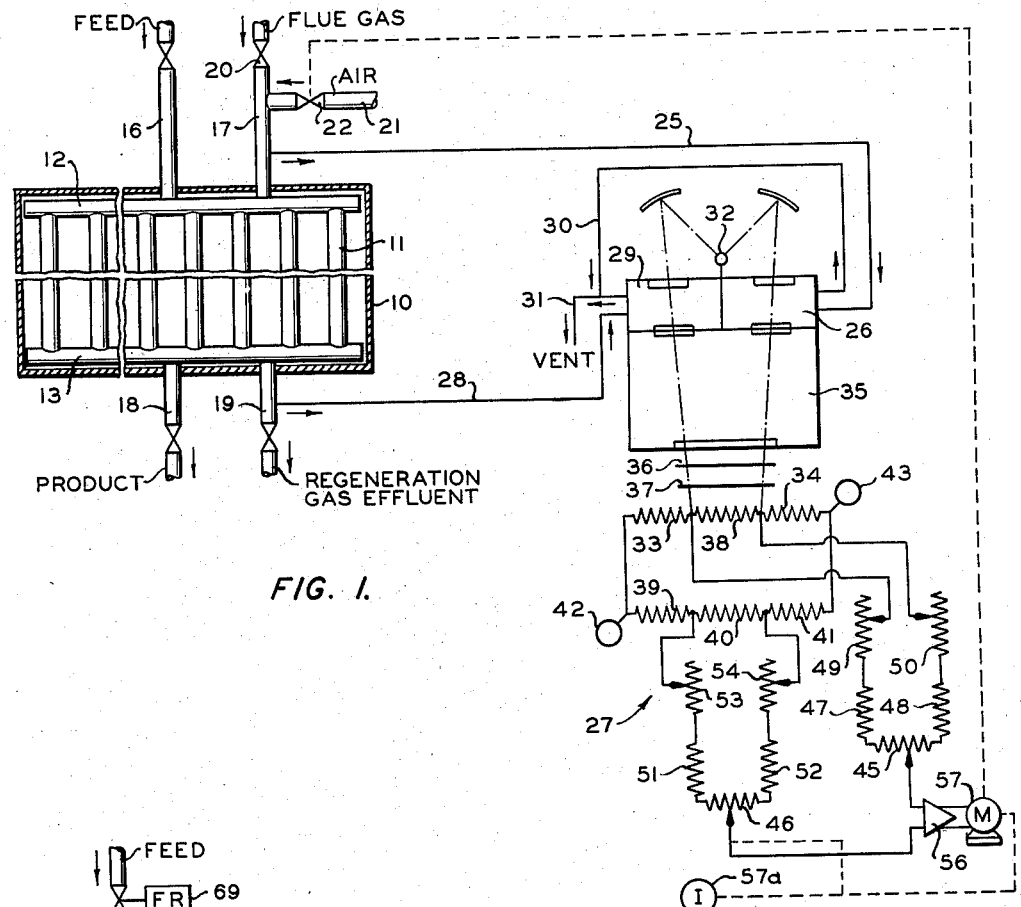
FIG. 1.
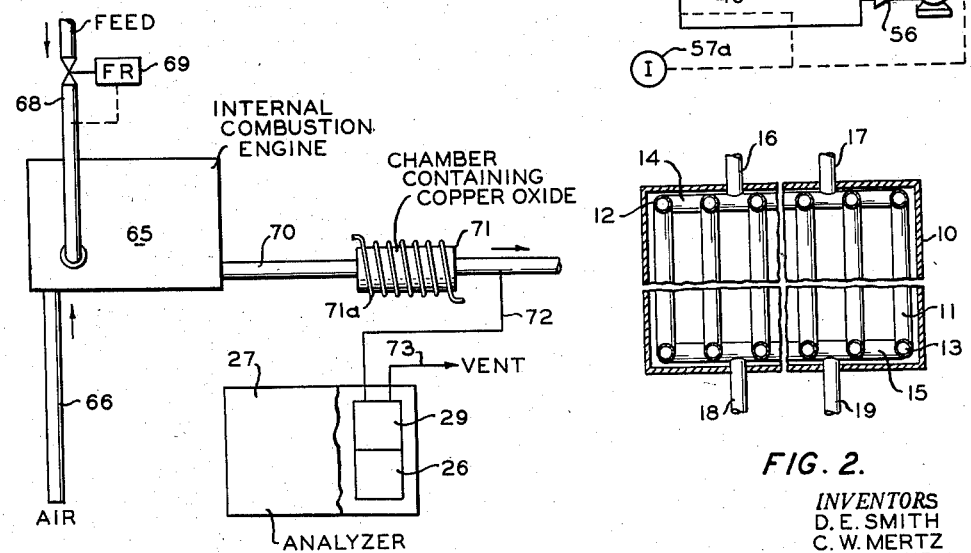
FIG. 3.
FIG. 2.
INVENTORS
D. E. SMITH
C. W. MERTZ
L. S. CROWELL
BY Hudson & Young
ATTORNEYS

United States Patent Office 2,908,818
Patented Oct. 13, 1959

2,908,818

ANALYZER AND CONTROL METHOD

Dexter E. Smith, Clyde W. Mertz, and Lloyd S. Crowell, Bartlesville, Okla., assignors to Phillips Petroleum Company, a corporation of Delaware Application March 24, 1955, Serial No. 496,467

12 Claims. (Cl. 250—43.5)

This invention relates to an infrared analyzer of novel construction. In another aspect, it relates to a method of controlling a catalytic regeneration operation. In still another aspect, it relates to a method of analyzing the performance of an internal combustion engine.

Heretofore, the presence of water, particularly water vapor, in a stream fed to an analytical instrument has caused considerable difficulties in making the analysis. This is particularly true where the component to be analyzed for is carbon dioxide. It is a major purpose of this invention to provide an analyzer wherein interference from water contained in the sample is substantially or completely eliminated, this being effected by provision of a mica filter in the radiation beam or beams used in the analysis.

The analyzer of the invention is particularly useful in controlling a catalytic regeneration operation, particularly where the catalyst is used for the dehydrogenation of butane. In this application, two radiation beams are provided with a sample cell in each beam. A sample of regeneration gas is fed to one cell while a sample of the regeneration effluent gases is fed to the other cell so that an output is produced which is representative of the relative concentration of carbon dioxide in the two streams. In this manner, a very accurate control of the regeneration can be effected and, indeed the control can be automatically carried out by utilizing a signal from the analyzer to turn off the supply of air or regeneration gas when the difference between the carbon dioxide concentrations of the two streams falls below a predetermined small value. In this system, the provision of a mica filter in both radiation beams permits the effect of water vapor which may be present to be eliminated from the instrument output with a further and important increase in the precision of control of the regeneration operation.

In another aspect, the analyzer of the invention is utilized to determine the carbon dioxide content of the exhaust gases from an internal combustion engine.

Accordingly, it is an object of the invention to provide an infrared analyzer of improved character wherein the effect of water vapor in the sample can be substantially minimized or wholly eliminated.

It is a further object to provide an improved system for controlling catalyst regeneration.

It is a still further object to provide an improved system for determining the amount of carbon dioxide present in the exhaust gases of an internal combustion engine.

Various other objects, advantages and features of the invention will become apparent from the following detailed description taken in conjunction with the accompanying drawings, in which:

Figure 1 is a view illustrating the analyzer in conjunction with a catalyst regeneration unit;

Figure 2 is a side view of the interior piping of the reactor of Figure 1;

Figure 3 is a view illustrating the analyzer as used in the analysis of exhaust gases from an internal combustion engine.

Figure 4:
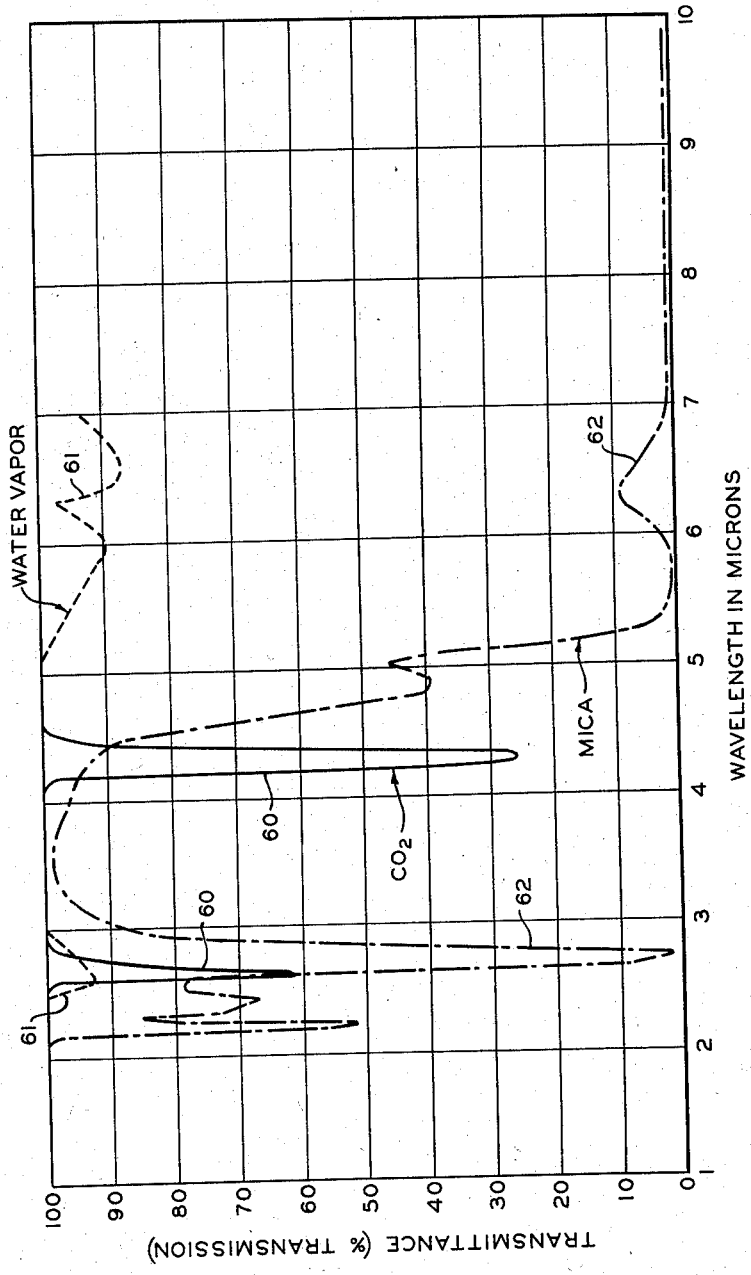
Figure 4 is a graph illustrating the operation of the radiation filters in the analyzer.

Referring now to Figure 1, we have shown a vessel 10 containing a series 11 of vertical pipes which are filled with a catalyst to be regenerated. In one important application of the invention, the catalyst is utilized for the dehydrogenation of butanes and can consist of 87 weight percent alumina, 8 weight percent chromia and 5 weight percent beryllia. Part or all of the beryllia can be replaced by chromia or alumina in this particular application. It will be understood, however, that the invention is broadly applicable to many types of catalyst regeneration whether conducted in a fixed bed, a moving bed, or in the fluidized state.

Each pipe 11, in the embodiment shown, is connected to a top header 12 and a bottom header 13, and the unit illustrated has several sets of headers 12, 13 which, in turn, are connected to a main upper header 14 and a main lower header 15, Figure 2. A feed pipe 16 and a line 17 for the introduction of regeneration gases are connected to the header 14 while a product outlet conduit 18 and a line 19 for withdrawing regeneration effluent gases are connected to the lower header 15, each of these lines or conduits being provided with a suitable control valve. Flue gas is fed to the line 17 from a valved conduit 20 and air is fed to the line 17 through a conduit 21 provided with an automatic control valve 22. Where regenerating the alumina base catalyst previously described, the flue gas can advantageously have a composition of 0.01 to 1 percent hydrogen, 0.1 to 1 percent carbon monoxide, 0.1 to 5 percent argon, 10 to 20 percent carbon dioxide and 1.0 to 10 percent oxygen, all percentages herein being percentages by weight. Sufficient air is added through the line 21 to maintain the desired oxygen content. In one specific case, the composition of the regeneration gas was 0.2% hydrogen, 82.0% nitrogen, 0.3% carbon monoxide, 1.0% argon, 14.0% carbon dioxide and 2.5% oxygen. During the regeneration cycle, the effluent gas contained about 16.3% carbon dioxide which dropped to 14.1% at the end of the regeneration cycle, which is normally about 60 minutes long. Thus, the end of the regeneration cycle is indicated by the carbon dioxide concentration in the effluent becoming equal to that of the incoming regeneration gas within a predetermined small value.

During the conversion cycle, feed, such as butane, passes into the vessel through the conduit 16 and the dehydrogenated product is withdrawn through conduit 18, it being understood that coke deposited on the catalyst during the process cycle is burned off during the regeneration cycle.

In accordance with in the invention, a sample of the gas in line 17 is continuously withdrawn through a pipe 25 and passed to a sample cell 26 forming a part of an infrared analyzer 27 while a portion of the effluent gas is continuously withdrawn through a pipe 28 and passed to a second sample cell 29, the cells being provided with vent pipes 30 and 31, respectively. Two beams of radiation are passed from an infrared source 32 onto a pair of detectors 33 and 34, such as bolometers. Also forming a part of the analyzer is a cell 35, a filter 36 and a filter 37, these filters being disposed in both radiation beams. The windows of the cells 26, 29 and 35 are formed from a material transparent to radiation of the wavelength used, for example, calcium fluoride.

The detectors 33, 34 are connected in a Wheatstone bridge circuit with impedances 38, 39, 40 and 41, a potential being applied across two opposite corners of the bridge from power supply terminals 42 and 43, and the output, representing the difference between the intensities of the radiation beams incident upon the detectors 33 and 34, appearing between the contactors of potentiometers 45 and 46.

Potentiometer 45 is connected in parallel with impedance 38 by fixed resistors 47 and 48 and reversely ganged variable resistors 49 and 50. Potentiometer 46 is connected in parallel with impedance 40 by fixed resistances 51, 52 and ganged variable resistances 53 and 54. Variable resistors 53, 54 serve as a sensitivity control while variable resistors 49 and 50 serve as a range control.

The contactors of potentiometers 45, 46 are connected to the input terminals of an amplifier 56 which drives a servomotor 57 having its shaft mechanically connected to the contactor of potentiometer 46. The motor 57 moves the contactor of potentiometer 46 until a balanced condition is obtained, at which balanced position the shaft of motor 57 is indicative of the difference in intensity of the radiation beams incident upon the detectors 33, 34. The motor can drive any suitable indicating, recording or control means, such as an indicator 57a, and the term "indicating means" as used herein is intended to cover any of the foregoing, whether alone or in combination. The circuit just described is similar in many respects to that shown by Hutchins Patent 2,579,825 to which reference is made for a fuller description of the operation of the detector circuit.

It will be understood that automatic repetitive standardization can be incorporated in the present instrument, in the manner illustrated by said Hutchins' patent. Also, in the present invention, various modifications can be made without departing from the spirit and scope of the invention. Thus, as will become apparent hereafter, other types of radiation can be used in some aspects of the invention, and useful results can be obtained in some cases by utilizing only one radiation beam or by eliminating certain of the filter elements to be more fully described hereafter.

With the system as thus far described, it will be evident that the analyzer indicates the relative proportions of carbon dioxide in the regeneration gas entering through line 17 and that leaving through line 19. Where the instrument is used in butane dehydrogenation, some butane may be present in the effluent line 19. The effect of this material can be eliminated by filling the cell 35 with normal butane which desensitizes both beams to the presence of this material. Interference from other hydrocarbon components can be substantially reduced or eliminated by forming filter 37 from polyethylene and inserting it into both beams. Various other filters can be introduced to eliminate other unwanted components which may appear in the sample, and to sensitize the instrument for various materials.

In particular, if no differential measurement is to be made, cell 26 can be filled with carbon dioxide, and the instrument will then indicate the carbon dioxide concentration in effluent line 19. Alternatively, a single sample cell can be used in both beams and a cell containing pure carbon dioxide placed in one beam so that said beam is insensitive to changes in carbon dioxide concentration while the other beam is sensitive to carbon dioxide concentration.

When the carbon dioxide content in line 19 becomes equal, within a small amount, say 0.1%, of the carbon dioxide concentration in line 17, servo-motor 57 closes valve 22 and prevents further passage of air to the regeneration vessel, thus minimizing further combustion within the regeneration vessel. This enables the length of the regeneration cycle to be reduced in many instances, i.e., increases the process time per cycle, with resultant substantial economies due to increased throughput. Alternately, the motor can be connected to valve 20 or to both valves 20 and 22.

With the instrument as thus far described, the presence of water vapor can cause serious interference with the results produced by the analyzer. In accordance with the invention, such interference is substantially or completely eliminated by the filter 36 which is formed from mica and is inserted in the path of both beams. Best results are obtained with muscovite mica, ASTM grade 3, clear quality, about 0.012 inch thick. The effect of this mica filter can be best understood by reference to Figure 4 which is a graph where wavelength in microns is plotted against percentage transmission.

The solid lines 60 represent the transmission of carbon dioxide, and it will be noted that transmission dips, i.e., absorption band, occur at wavelengths of about 2.7 microns and 4.3 microns. The transmission characteristics of water are indicated by the dashed lines 61, and it will be noted that water has an absorption band at 2.7 microns and a further absorption band at wavelengths greater than 5 microns. The interfering effect of the water vapor is eliminated by the mica filter, the characteristic of which are illustrated by dashed line 62. This material is substantially opaque at a wavelength of about 2.7 microns and at wavelengths higher than about 5.1 microns so that the effect of the water vapor is substantially eliminated, and does not affect the changes in instrument reading caused by changes in concentration of carbon dioxide.

It has been found that the mica is a distinct improvement over sapphire insofar as the elimination of water vapor interference is concerned. Thus, sapphire transmits a substantial amount of radiation at wavelengths between 5 and 6 microns so that the effect of the water vapor is not wholly eliminated in this band, and sapphire is further not effective in cutting out the interference at about 2.7 microns. Thus, a substantial increase in accuracy is obtained by the provision of mica filter 36 where the sample contains appreciable quantities of water or water vapor.

In one practical instrument, the mica filter was 0.012" thick, although the desired thickness will, of course, depend to a considerable degree on the amount of water present and the material of the component being analyzed. In general, the thickness will vary between 0.001" and 0.1".

In Figure 3, we have illustrated the use of the analyzer in analyzing the exhaust gases of an internal combustion engine 65. In determining fuel-air ratios in accordance with the invention, air is supplied through a conduit 66 therein while fuel is supplied through a pipe 68 at a rate determined by the flow regulator 69. Gases leave the engine through an exhaust pipe 70 and thence pass through a vessel 71 containing copper oxide or other catalyst capable of converting carbon monoxide to carbon dioxide, which is heated by a coil 71a.

The analyzer, which is the same as shown in Figure 1, has sample cell 29 connected to the exhaust conduit 70 downstream of vessel 71 by a sample line 72, and the cell 29 is further provided with a vent line 73. If desired, a multiposition valve can be provided so that the sample can be withdrawn at any one of several spaced locations along the exhaust pipe, either before or after the vessel 71. In one embodiment of the invention, cell 26 is filled with carbon dioxide so that one radiation beam is sensitive to the carbon dioxide concentration while the other beam is not. In this manner, the carbon dioxide content of the exhaust gases is continuously determined. In the system of Figure 3, the butane filter can in many cases be replaced by the polyethylene filter 37, which is useful because of the presence of hydrocarbon constituents in the exhaust gases. The mica filter 36 eliminates the effect of water vapor in the exhaust gases so that the water vapor has no effect upon the instrument reading.

In some cases, a single beam instrument can be used in Figure 3 or, alternatively, sample cells 26, 29 can be interconnected so that the exhaust gas flows through both cells, and an additional cell containing pure carbon dioxide can be inserted in one of the beams sensitive to the carbon dioxide concentration while the other beam is not so sensitized. With either of these arrangements, the carbon dioxide content of the exhaust gas is accurately determined in a continuous and accurate manner.

The copper oxide when heated to a high temperature, say 1200° F. in vessel 71 insures that all carbon in the fuel not converted in the engine, appears in the form of carbon dioxide. Thus, the measurement is made without the necessity of accurate metering devices on the air and exhaust streams, since a quantitative conversion of all carbon in the fuel to carbon dioxide is made.

While the invention has been described in connection with present, preferred embodiments thereof, it is to be understood that this description is illustrative only and is not intended to limit the invention.

We claim:

1. In an infrared analyzer, in combination, a source of infrared radiation, radiation detector means, means for directing radiation from said source onto said detector means, indicating means producing an output representative of the intensity of radiation impinging upon said detector means, a sample cell in the path of said radiation for containing a sample having water present therein, and a filter formed from mica in the path of said beam, whereby the detector is rendered insensitive to the presence of water in said sample.

2. In an infrared analyzer, in combination, a source of infrared radiation, a pair of radiation detector units, means for directing radiation beams from said source onto the respective detector units, indicating means producing an output representative of the relative intensity of radiation impinging upon said detector means, means for passing a sample containing water through the path of at least one beam, filter means disposed in the path of said radiation to make one beam sensitive to the presence of a selected component and the other beam insensitive to the presence of said component, and a mica filter disposed in the path of both beams to eliminate the effect of water in said sample.

3. In an infrared analyzer, in combination, a source of infrared radiation, a pair of detector units, means for directing beams of radiation from said source onto said detector units, indicating means connected to said detector units to produce an output representative of the relative intensities of the beams falling upon said detector units, a sample cell in the path of each beam, a cell containing normal butane disposed in the path of both beams, a polyethylene filter in the path of both beams, and a mica filter in the path of both beams, whereby the analyzer is sensitized to the concentration of carbon dioxide in the sample and insensitive to the presence of water therein.

4. In a catalytic conversion system that has in combination, a vessel containing catalyst to be regenerated, an inlet line connected to said vessel to supply a regeneration gas thereto, an effluent line to withdraw regeneration gases from said vessel, an analyzer including a radiation source, a pair of radiation detectors, means for directing beams of radiation from said source onto the respective radiation detectors, a pair of sample cells, each one of which is disposed in one of the respective radiation beams, indicating means producing an output representative of the relative intensities of radiation impinging upon said detector means, a pipe connecting one sample cell to said inlet line, a pipe connecting the other sample cell to said outlet line, and vent pipes connected to both sample cells, the improvement comprising a mica filter disposed in said means for directing and between said source and said detectors.

5. In a catalytic conversion system, in combination, a vessel containing a catalyst to be regenerated, a line connected to said vessel to introduce a mixture of flue gas and air thereto, an outlet line connected to said vessel to withdraw regeneration gas therefrom, an infrared analyzer including a source of infrared radiation, a pair of detector units, means for directing beams of radiation from said source onto the respective detector units, indicating means connected to said detector units to produce an output representative of the relative intensity of radiation falling upon said units, a pair of sample cells disposed in the path of the respective radiation beams, filter means in said beams to sensitize same to the presence of carbon dioxide, and a mica filter in the path of both beams to desensitize the analyzer to the presence of water, a sample pipe connecting said inlet line to one sample cell, a sample pipe connecting said outlet line to the other sample cell, and vent pipes connected to both sample cells.

6. In a catalytic conversion system, in combination, a vessel containing a catalyst to be regenerated, a line connected to said vessel to introduce a mixture of flue gas and air thereto, an outlet line connected to said vessel to withdraw regeneration gas therefrom, an infrared analyzer including a source of infrared radiation, a pair of detector units, means for directing beams of radiation from said source onto the respective detector units, indicating means connected to said detector units to produce an output representative of the relative intensity of radiation falling upon said units, a pair of sample cells disposed in the path of the respective radiation beams, filter means in said beams to sensitize same to the presence of carbon dioxide, a mica filter in the path of both beams to desensitize the analyzer to the presence of water, a sample pipe connecting said inlet line to one sample cell, a sample pipe connecting said outlet line to the other sample cell, and vent pipes connected to both sample cells, a valve controlling the amount of air fed to said regeneration vessel, and servomechanism connected to said indicating means and responsive to the relative concentrations of carbon dioxide in the inlet and outlet gases, said servomechanism being connected to said valve to close same when the difference between said carbon dioxide concentrations reaches a predetermined small value.

7. In a catalytic conversion system, in combination, a vessel containing a catalyst to be regenerated, a line connected to said vessel to introduce a mixture of flue gas and air thereto, an outlet line connected to said vessel to withdraw regeneration gas therefrom, an infrared analyzer including a source of infrared radiation, a pair of detector units, means for directing beams of radiation from said source onto the respective detector units, indicating means connected to said detector units to produce an output representative of the relative intensity of radiation falling upon said units, a pair of sample cells disposed in the path of the respective radiation beams, a cell disposed in the path of both beams containing normal butane, a polyethylene filter in the path of both beams, and a mica filter in the path of both beams to desensitize the analyzer to the presence of water, a sample pipe connecting said inlet line to one sample cell, a sample pipe connecting said outlet line to the other sample cell, and vent pipes connected to both sample cells.

8. A method of controlling a catalyst regeneration step which comprises passing a mixture of flue gas and air through a bed of spent catalyst, withdrawing effluent gases from said bed, passing a beam of infrared radiation through a mica sheet and through a sample of said gas mixture, producing an electrical output representative of the beam intensity after it has passed through said mica and said mixture, passing a second beam of radiation through a mica sheet and through a sample of said effluent gas, producing an output representative of the intensity of said beam after it has passed through said mica and said effluent, and producing a resultant voltage representative of the difference in said electrical outputs.

9. A method of analyzing the operation of an internal combustion engine which comprises continuously withdrawing a sample of the exhaust products of said engine, passing a beam of radiation through a mica sheet and then through the withdrawn sample, producing an electrical output representative of the intensity of said beam after it has passed through said mica and said sample, and indicating said output.

10. The method of analyzing the exhaust gases of an internal combustion engine which comprises continuously withdrawing a sample of the exhaust products of said engine, passing a beam of infrared radiation through a mica sheet and then through said sample, passing a second radiation beam through a mica sheet, and producing an electrical output representative of the relative intensities of said beams after they have passed through the mica sheet and through the sample and mica sheet, respectively.

11. In a system for analyzing the performance of an internal combustion engine, in combination, an internal combustion engine having an exhaust conduit, a vessel containing copper oxide in said exhaust conduit, means for heating said vessel, an infrared analyzer including a radiation source, a pair of radiation detectors, means for directing beams of infrared radiation from said source onto the respective detectors, a pair of cells in the paths of the respective beams, one of said cells containing carbon dioxide, a sample line connecting said exhaust conduit to the other sample cell, a vent line connected to the other sample cell, a mica filter in both beams, and a polyethylene filter in both beams.

12. In a system for analyzing the performance of an internal combustion engine, in combination, an internal combustion engine having an exhaust conduit, a vessel containing copper oxide in said exhaust conduit, means for heating said vessel, an infrared analyzer including a radiation source, a pair of radiation detectors, means for directing beams of infrared radiation from said source onto the respective detectors, a pair of cells in the paths of the respective beams, means for withdrawing a sample from said conduit downstream of said vessel and passing it through at least one of said sample cells, a mica filter in the path of both beams, means for desensitizing one beam to changes in concentration of carbon dioxide, and indicating means connected to both radiation detectors.

References Cited in the file of this patent

UNITED STATES PATENTS

| | | |
|---|---|---|
| 2,621,297 | Obermaier | Dec. 9, 1952 |
| 2,685,649 | Miller | Aug. 3, 1954 |
| 2,703,844 | Miller | Mar. 8, 1955 |
| 2,720,594 | Hutchins | Oct. 11, 1955 |
| 2,721,942 | Friel et al. | Oct. 25, 1955 |
| 2,817,691 | Hutchins | Dec. 24, 1957 |